United States Patent
Mortensen et al.

(10) Patent No.: US 8,254,269 B2
(45) Date of Patent: Aug. 28, 2012

(54) METHOD AND APPARATUS FOR INSPECTION OF COMPRESSED DATA PACKAGES

(75) Inventors: Brian Mortensen, København S (DK); Michael S. Berger, København S (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 134 days.

(21) Appl. No.: 12/450,882

(22) PCT Filed: Apr. 16, 2008

(86) PCT No.: PCT/DK2008/000137
§ 371 (c)(1), (2), (4) Date: Oct. 16, 2009

(87) PCT Pub. No.: WO2008/125112
PCT Pub. Date: Oct. 23, 2008

(65) Prior Publication Data
US 2010/0110915 A1    May 6, 2010

Related U.S. Application Data

(60) Provisional application No. 60/907,772, filed on Apr. 17, 2007.

(30) Foreign Application Priority Data

Apr. 17, 2007 (EP) ..................... 07388024

(51) Int. Cl.
*G01R 31/08* (2006.01)
(52) U.S. Cl. .................... 370/241; 370/521; 709/247
(58) Field of Classification Search .............. 370/252, 370/235–238, 389–427, 475, 241, 521–546; 341/9–10, 90–92, 50–51; 709/200, 257, 709/247

See application file for complete search history.

(56) References Cited

U.S. PATENT DOCUMENTS
6,100,825 A * 8/2000 Sedluk et al. ............... 341/51
(Continued)

FOREIGN PATENT DOCUMENTS
WO    WO 2006/069278 A2    6/2006

OTHER PUBLICATIONS

Dharmapurikar, Sarang et al., "Deep Packet Inspection using Parallel Bloom Filters", Proceedings of the 11$^{th}$ Symposium on High Performance Interconnects, 2003, pp. 1-8, IEEE.

*Primary Examiner* — Pao Sinkantarakorn
*Assistant Examiner* — Iqbal Zaidi
(74) *Attorney, Agent, or Firm* — Nath, Goldberg & Meyer; Jerald L. Meyer; Stanley N. Protigal (57) ABSTRACT

A method for inspection of compressed data packages, which are transported over a data network, is provided. The data packages comprise a data package header containing control data for securing the correct delivery and interpretation of the package and a payload part containing data to be transferred over the data network. The method comprises the steps of: a) extracting payload data from the payload part of the package, b) appending the extracted payload data to a stream of data, c) probing the data package header so as to determine the compression scheme that is applied to the payload data, d) applying the determined compression scheme to at least one search pattern, which has previously been stored in a search key register, and e) comparing the compressed search pattern to the stream of data. The method can be carried out by dedicated hardware.

19 Claims, 6 Drawing Sheets

U.S. PATENT DOCUMENTS

| | | | |
|---|---|---|---|
| 7,428,573 B2 * | 9/2008 | McCanne et al. | 709/203 |
| 7,606,267 B2 * | 10/2009 | Ho et al. | 370/477 |
| 7,764,673 B1 * | 7/2010 | Asawa et al. | 370/389 |
| 2003/0033531 A1 | 2/2003 | Hanner | |
| 2005/0154802 A1 | 7/2005 | Kravec et al. | |

* cited by examiner

METHOD AND APPARATUS FOR INSPECTION OF COMPRESSED DATA PACKAGES

This is a National Phase Application filed under 35 USC 371 of International Application No. PCT/DK2008/000137, filed on Apr. 16, 2008, an application claiming the benefit under 35 USC 119(e) of U.S. Provisional Application No. 60/907,772, filed on Apr. 17, 2007, and claiming foreign priority benefit under 35 USC 119 of European Application No. 07388024.7, filed on Apr. 17, 2007, the content of each of which is hereby incorporated herein by reference in its entirety.

TECHNICAL FIELD

The present invention relates to a method and an apparatus for inspection of compressed data packages, which are transported over a data network, the data packages comprising a data package header containing control data for securing the correct delivery and interpretation of the package and a payload part containing data to be transferred over the data network.

BACKGROUND ART

During the last 10 years, the Internet has become an all encompassing means for connecting computers globally. The ever increasing use of the Internet has resulted in more and more services being offered, and the increasing number of computers connected to the network has caused a veritable explosion in the amount of data transferred.

Another factor in the use of the public Internet is the presence of a great variety of malicious programs like viruses and worms or the like, which spread across the Internet. Detection and blocking of these programs is extremely important, not only for the private user, but even more for corporations, which rely almost entirely on a fully functional network, both internally for their users and externally with customers and partners. An infection of a corporate network with malicious software can be very costly and can render a corporate data network unusable for days and invaluable data may be lost. This can have a major financial impact for the corporation.

Also the providers of data networks like Internet Service Providers (ISPs) face the task of protecting their networks from infection. ISPs provide Internet connections to a large number of customers and can carry a significant amount of Internet traffic on their backbone. Backbone links with capacity of 10 Gbps or more are now possible. The ISPs must employ means for protecting their infrastructure from interruption, thus causing downtime for the customers. They can also in some cases be contractually obliged to ensure that no malicious software penetrate from their network into their customer corporate network.

For corporate users and ISPs alike, it should be possible to apply protection to parts of the infrastructure, wherein data traffic from a large number of users flow.

Historically these kinds of protection means have been implemented on the lower levels of the OSI model. Protection was provided by blocking or allowing specific ranges of IP addresses or TCP/UDP ports, i.e. layer 3 and layer 4 of the OSI model. However, this approach has turned out to be much too crude to provide sufficient protection.

Newer methods involve methods for inspecting the data traffic on higher levels of the OSI model. This means that the employed devices must be able to recognise specific malicious data patterns all the way up layer 7 in the OSI model, which also means that the devices must be able to extract streams belonging to the same user and application from the data traffic. Furthermore, they must be able to inspect each stream in parallel with the streams from all other users and applications.

Pattern matching is currently implemented using software centric solutions which typically have large flexibility but suffer from low throughput.

Other pattern match methods typically de-compress the data before the actual search is carried out. This has the undesired effect that the necessary bandwidth may have to be many times the bandwidth of the incoming data. Therefore, searching in such de-compressed data is difficult or impossible to perform at line speed.

Dedicated hardware solutions have also been presented but typically they do not allow the use of advanced search combinations and regular expression matching. US 2005/0154802 A1 describes a parallel pattern detection engine (PPDE) using multiple underlying processor units (PU) to search for various patterns. The PUs can be utilised in single mode or cascade mode. Cascade mode supports longer patterns to be matched or more patterns to be matched.

Specifically targeting string matching applications, the invention focuses on processing data at high speed (>10 Gbps). Internet contents are usually compressed before transmission in order to obtain low bandwidth and low latency. This approach is possible due to the increased processing capabilities found in standard PCs. The high processing power can be used to decompress the Internet contents.

In general, decompression is difficult to perform at wire-speed due to the additional data-amounts generated, which means that a decompressed 10 Gbps link may contain e.g. 30-40 Gigabit data per second, which must be stored and processed during the packet inspection process. Depending on the packet inspection method employed, this is either not possible at all, or results in high cost of the inspection device due to the large amount of storage and processing power.

DISCLOSURE OF THE INVENTION

The present invention aims to reduce the workload of the de-compression and search engine by presenting a novel and improved hardware architecture and method. The aim of the invention is thus to provide a new and improved method and apparatus for inspecting data packages of a data stream.

This is achieved by determining the compression method used on the stream of data to be inspected and applying it on the on the search pattern and thus reducing the workload of the de-compression and search engine, by applying the steps of: a) extracting payload data from the payload part of the package, b) appending the extracted payload data to a stream of data, c) probing the data package header so as to determine the compression scheme that is applied to the payload data, d) applying the determined compression scheme to at least one search pattern, which has previously been stored in a search key register, and e) comparing the compressed search pattern to the stream of data.

Thereby, it is possible to find a match in the data packages of the data stream without the need for decompressing the data stream before inspection, thereby avoiding the possibility of "data explosions".

According to a preferred embodiment of the invention, the data packages are compressed using an <offset, length> compression scheme. This type of compression is particularly useful, when there are repeated patterns in the uncompressed data. The repeated patterns are in this case replaced by a pointer to the previous occurrence and the search engine can skip searching in all data given by the <offset, length> pointer, since this data has already been examined, thus reducing the overall inspection time.

In a particular embodiment of the invention, the extracted payload data in step b) is applied to the stream of data by storing the payload data in a memory means and appending it to previously extracted payload data to form the stream of data.

In a further embodiment of the invention the stream of data, which is transferred over the data network is formatted according to the Hypertext Transfer Protocol (HTTP). Hereby it is achieved, that the method is applicable for data streams transferred using the Internet and for the growing numbers of corporate application using HTTP.

In a further embodiment of the invention the search pattern may contain one or more specific signs or wildcards for representing predefined character patterns or truncations. Thereby, it is achieved that one search pattern can cover a number of specific patterns, thus reducing the memory amount needed to store the search patterns.

In a further embodiment of the invention the data packages are coded according to the Internet Protocol (IP).

According to a preferred embodiment of the invention, the compression scheme in step d) is applied to two or more search patterns and the data stream in step e) is inspected for these search patterns in parallel. Thereby, it is possible to search the data packages for several search patterns at the same time, without increasing the overall inspection time.

In another embodiment according to the invention, the data packages are transported between a client and a server, and the method further comprises the step of: f) sending a response to the client or the server (or a third party server), if a match between the search pattern and the stream of data is detected in step e), the response comprising information related to the search pattern matched. Thus, the client or third party server can be informed of the presence of specific search patterns immediately after such search patterns have been detected.

In another embodiment according to the invention, commercial information is presented to the client or third party server in step f) based on the detection of search patterns in step e). The detected patterns may relate to the commercial information itself, or the commercial information may be derived from the context or taxonomy of the detected search patterns. Thus, the client or third party server has the possibility of responding quickly to the presence of such commercial information.

According to an advantageous embodiment, a search string has been sent from the client and stored in the search key register prior to step d). Thereby, the search key register can be continuously updated from the client in order to search for relevant search strings.

According to another advantageous embodiment, information related to parental control applications is presented to the client or third party server in step f). Thus, the client can be informed if the data packages contain data, which is unsuitable for e.g. presentation to children, and appropriate actions can be carried out in order to prevent such data to be displayed to the children.

In yet another embodiment according to the invention, location information is provided to the client or third party server during step f). The location information can for instance be a specific IP-address. Thereby, it is made possible to inform the local authorities with the location of for instance a server providing and/or distributing illegal data.

According to another embodiment, intrusion detection and/or intrusion prevention actions are carried out, if a specific intrusion search string is detected during step e). Thus, appropriate actions can be carried out in order to block data from a source, which illegally tries to gain access to for instance a user's computer.

According to yet another embodiment, the method also inspects uncompressed data packages using uncompressed search strings. Thus, the method can be used for both inspecting compressed data packages and uncompressed data packages.

The purpose of the invention is further achieved by an apparatus for inspection of a stream of data, which is transported over a data network, the data stream being split up into a number of data packages, the data packages comprising at least a header part containing control data for securing the correct delivery and interpretation of the package and a payload part containing data to be transferred over the data network, wherein the apparatus comprises: extraction means for extracting the payload parts of the data packages, probing means for probing the header part and determining the compression scheme applied to the payload part, a search key register for storing at least one search pattern, compression means for compressing the search pattern using a predetermined compression scheme, and a comparator for comparing the search pattern to the data stream.

Hereby is achieved that the aforementioned method can be implemented and carried out in hardware, thus speeding up the search for patterns even further. The predetermined compression scheme is determined by the probing means, when probing the header part.

According to a preferred embodiment, the apparatus further comprises a control module for performing relevant actions, when a match between the search pattern and the data in the data stream is found.

Preferably, the data stream is compressed using <length, offset> compression. This means that the compression means also must be adapted to compress the search patterns using this type of compression. The apparatus is particularly suited for this type of compression, since repeated patterns can be represented by a pointer, which only has to be searched once, thereby reducing the overall inspection time.

In another embodiment of the apparatus according to the invention, the compression means includes a memory structure with control circuits, the memory structure comprising: a First In First Out (FIFO) data queue for temporarily storing an incoming compressed data stream, a multi port memory for storing the compressed data, a write pointer decision engine for controlling transfer of data from the FIFO data queue to the multi port memory, a copy engine for copying between locations in the multi port memory based on <offset, length> compression commands found in the incoming data stream, and a read pointer decision engine for controlling the transfer of data from the multi port memory. Hereby, a particularly simple and efficient apparatus for searching in <offset, length> compressed data is provided.

Further, the apparatus can comprise a multiplexer circuit for loading and transmission of the incoming data stream and the compressed search pattern.

The apparatus of the invention is preferably implemented by use of micro-engines, where each micro-engine compresses a specific search string using the compression rules carried in the header part of the data packages. Each micro engine can compare the compressed search string to the compressed data in parallel, thereby being able to inspect the data packages for several search strings without increasing the overall inspection time.

In another embodiment of the invention, the apparatus is implemented using programmable hardware circuits like Field Programmable Gate Arrays (FPGA) or ASICS. Thereby, a particular simple embodiment without the need for specially designed integrated circuits is provided.

In another embodiment of the invention, the reading of data to and from the multiport memory can be performed with different clock speeds, thus allowing a speeding up of the process.

The invention is useful for a great variety of applications, such as parental control or similar, where searches for particular words are used, or against denial-of-service attacks in connection with firewalls, gateways, switches, routers or similar.

It is clear that the apparatus may be adapted to carry out any of the aforementioned methods. Thus, the apparatus may be adapted to inspect a packet flow between a client and a server. Further, the apparatus may be adapted to respond to the client or third party server with information related to a specific search pattern detected in the packet flow. Further, the apparatus may be adapted to present commercial information to the client and/or server based on detection of search patterns. Additionally, the apparatus may be adapted to accept search strings from the client and respond to the client and/or server about the presence of the search strings in the packet flow between the client and the server.

Furthermore, the apparatus may be adapted to block data packages based on a parental control application, for instance implemented in a separate module or block in the apparatus. Additionally, the apparatus may be adapted to combine search results with location information in order to provide location specific information to the client. Also, the apparatus may be adapted to detect intrusions and to take intrusion prevention actions, when such intrusions are detected. This function may be implemented in a separate module or block in the apparatus. Finally, the apparatus may also be adapted to search in uncompressed data packages using uncompressed search strings, the apparatus thereby being able to search for search strings in both compressed and uncompressed data packages.

BRIEF DESCRIPTION OF THE DRAWINGS

The invention is explained in detail below with reference to the drawings, in which.

DETAILED DESCRIPTION OF THE INVENTION

The invention is described as an embodiment to be employed in the public Internet, but it may readily be employed in other types of network, where a search for known patterns within a data stream is employed.

Figure 1:
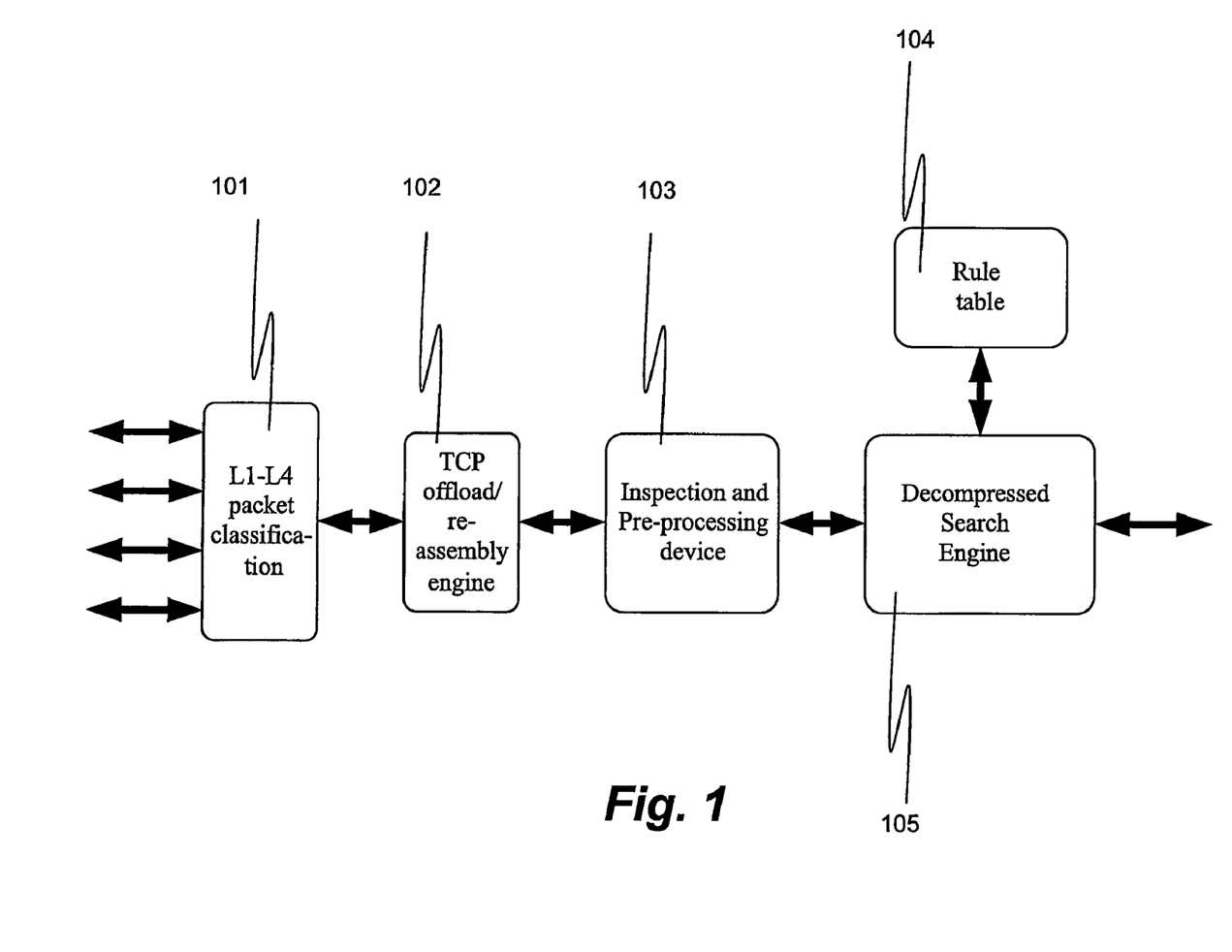
FIG. 1 shows a block-level diagram of a system for deep packet inspection according to the invention, FIG. 2 a high-level diagram of the main elements of the invention, FIG. 3 an illustration of the composition of the individual data packages and the interaction with micro-engines according to the invention, FIG. 4 a detailed diagram of the memory structure and related logical components, FIG. 5 the internal organisation of a micro engine.

FIG. 1 depicts an application of the apparatus in a system for packet inspection, where the packets are pre-processed, before the actual search for a pattern is performed. In a packet classification block 101, the packet is treated on layer 1 to 4 of the OSI model, meaning that the control and header information of the relevant protocols are processed in a known fashion, and only packets that are to be processed are forwarded. In block 102, the packets belonging to the same TCP session are formed into one stream, which is also known. The inspection and pre-processing block 103 extracts information regarding character sets (MIME types) and content encoding (Compression) utilised by the Rule table 104 and decompressed search engine 105.

Figure 6:
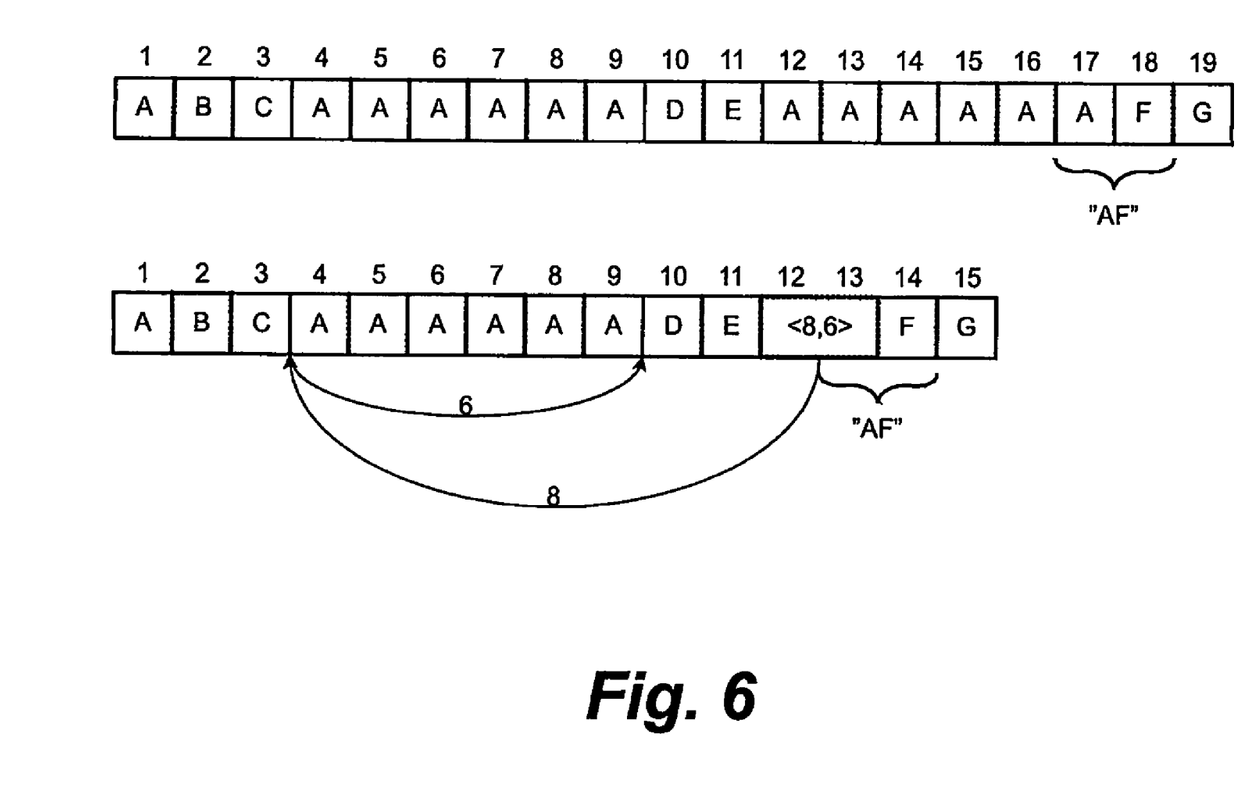
FIG. 6 illustrates the principle behind <offset, length> compression.

FIG. 6 illustrates the principles behind <offset, length> compression. The figure illustrates the situation, where pattern "AAAAAA" is repeated, and where the second occurrence is substituted by an <offset, length> field equal to <8, 6> pointing to the previous occurrence. A copy engine copies <length> bytes of data (here 6 bytes) from a position shifted <offset> bytes of data from the current position (here 8 bytes) to the current position. The amount of RAM storage is related to the maximum supported offset value, e.g. 32 Kbytes. A search engine can skip searching in already consulted text, and only the "borders" of the copied data examined. This is exemplified in FIG. 6 with search pattern AF. Here, the A is contained in the "border" of the copied block.

Figure 2:
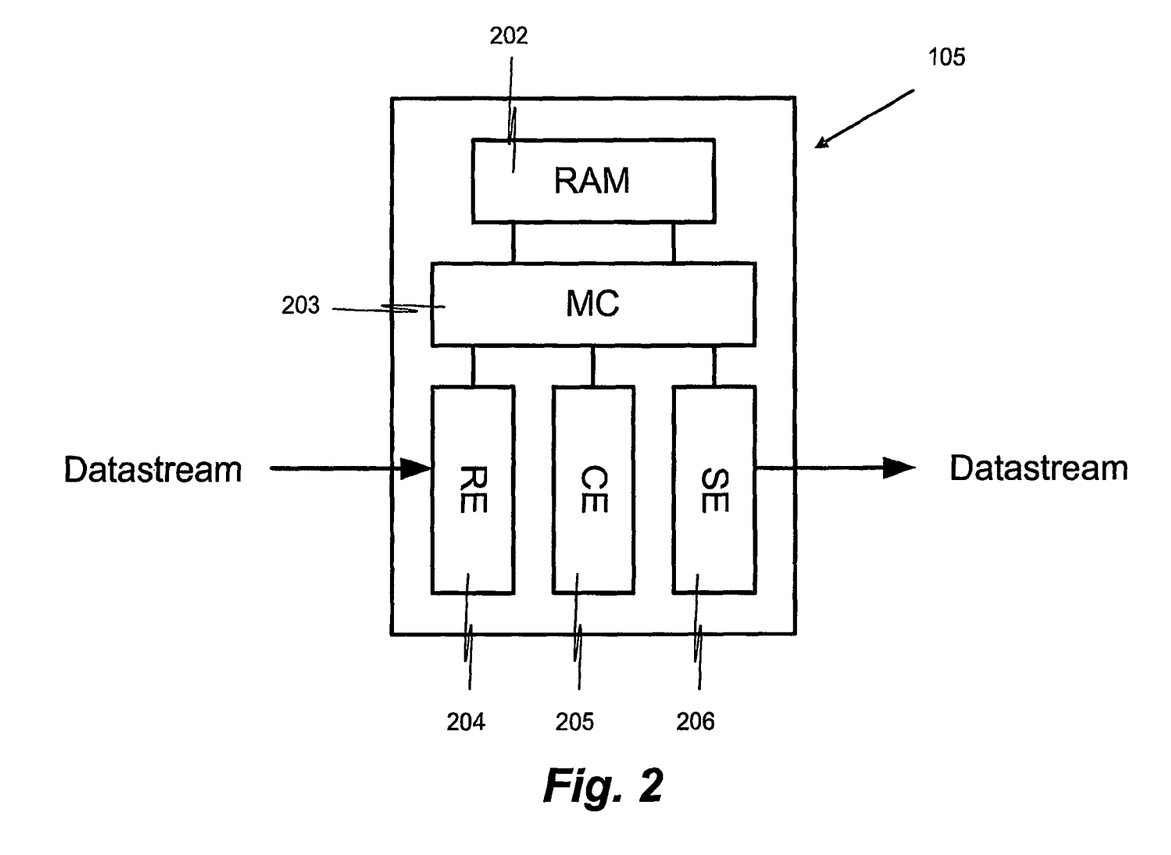

The system illustrated in FIG. 2 receives incoming <offset, length> compressed packet data and performs search for specific patterns in the packet payload. The data traffic might belong to several different flows, and the purpose of the Reassembly Engine (RE) 204 is to collect segments from different flows to form complete information. The packet data is stored in the RAM by the Memory Controller (MC) 203. At the same time, a Search Engine (SE) 206 examines the data for predefined keywords <search strings>. The Copy Engine (CE) 205 copies a section of data in the RAM 202 specified by the <offset, length> values in the data. The repeated patterns are in this case replaced by a pointer to the previous occurrence. The method for fast pattern match stores the incoming compressed data in a memory RAM 202 with a size equal to the maximum allowed offset value (e.g. 32 k). If an <offset, length> field is received, the data is copied from the memory to the current location.

Figure 3:
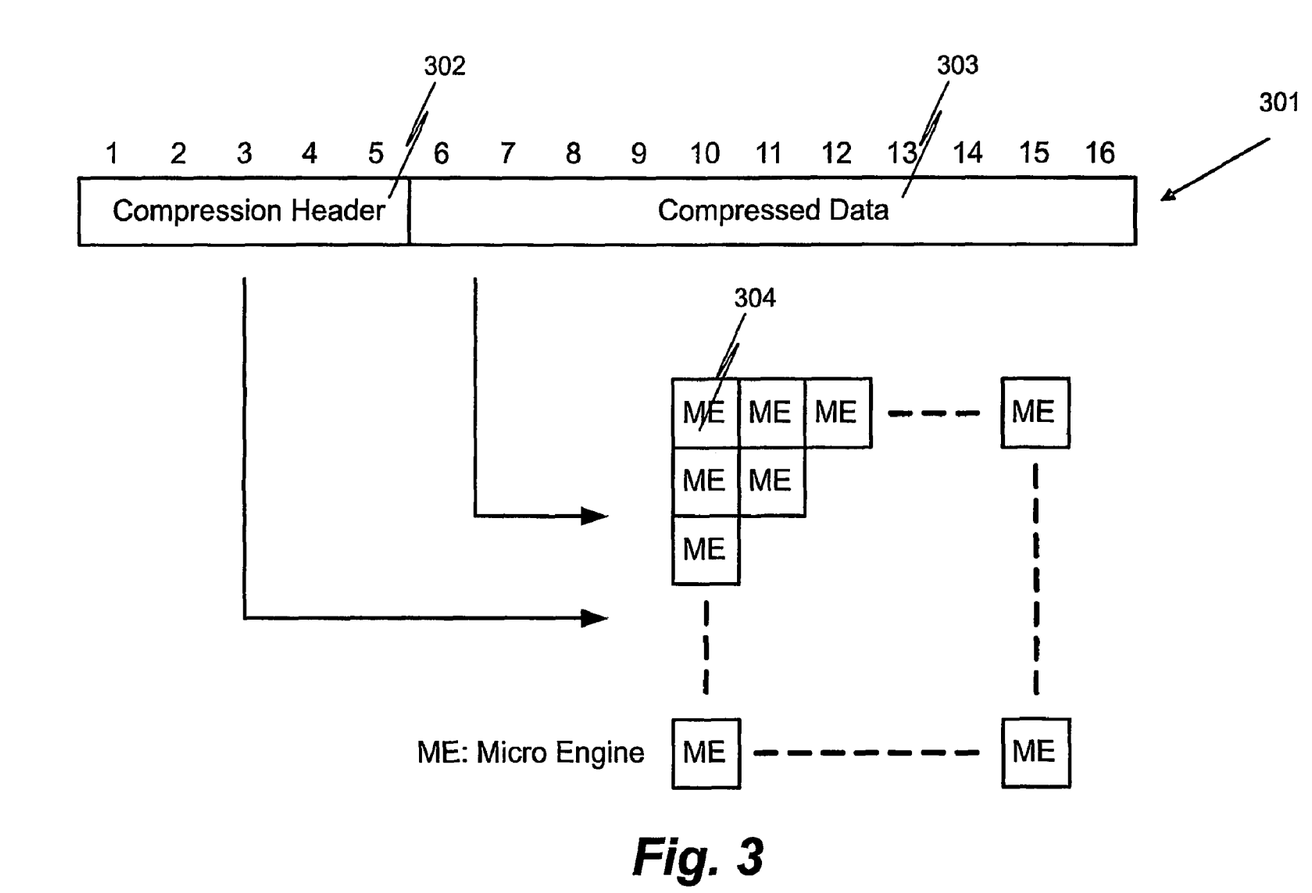

The data packages of the data stream comprise a compression header 302 and a payload part consisting of compressed data 303. The compression header 302 in FIG. 3 contains information on the compression strategy applied to the compressed data. The compression header 302 is used by each Micro Engine 304 to compress the search patterns. Each ME 304 contains a specific search pattern which is compressed and compared to the compressed data contained in the packet. The MEs 304 function in parallel and independently, thus allowing high speed operation.

Figure 4:
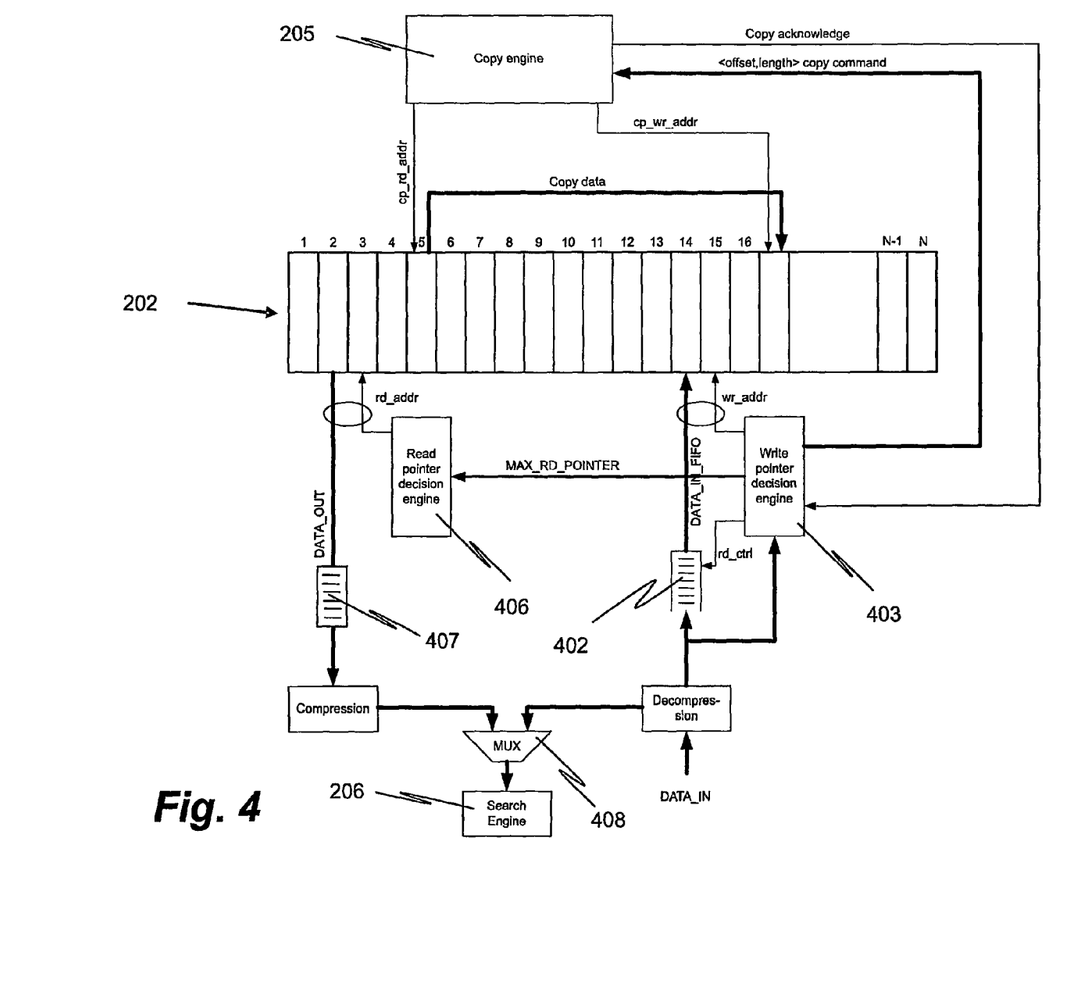

FIG. 4 shows a detailed diagram of the memory structure and related logical components. Compressed input data is stored in an input FIFO 402, while the write pointer decision engine 403 keeps track of this process. The write pointer decision engine 403 controls the writing into the multi-port memory structure 403 by asserting the "rd_ctrl" and "wr_addr" signals. If an <offset, length> command is found in the incoming data, it is checked for validity and a copy command is issued to the copy engine 205. The write pointer decision engine 403 can continue writing data into the multi-port memory structure 202 on the other side of the copy block. This feature enables the system to perform at line speed. If, for some reason, the write pointer decision engine 403 needs to stall the incoming data flow, it can be accommodated due to the FIFO 402 at the input.

The write, read and copy directions are all progressing in the same direction, but not necessarily at the same speed. The copy command forwarded to the copy engine 202 contains the absolute start address of the block to be copied (abs_src_ start_cp_addr), the absolute start address of the new location (abs_dst_start_cp_addr), and the length of the block to be copied (abs_length). More parameters may of course be provided. The absolute copy start address and the absolute start address of the new locations are calculated within the write pointer decision engine 403. The copy engine 205 controls the cp_rd_address and the cp_wr_addr in addition to rd enable and wr_enable of the respective ports on the multi-port memory 202 structure. Once a copy operation is complete an acknowledge signal is asserted (cp_ack), which indicates to the write pointer decision, engine that the copy operation has completed. If multiple copy commands have been scheduled a copy identifier (cp_id) can be used for book-keeping purposes. Multiple copy commands may be pending in the copy engine 205, which keeps the commands stored internally in a FIFO structure. This feature is useful if the multi-port memory 202 structure for one or another reason needs a small time period without any writing activity. This might be the case, for instance, when using DRAM (but not limited to), to build the multi-port memory 202 structure. The read pointer decision engine 406 can read data from the multi-port memory 202 structure using the signal rd_addr and other dedicated control signals. The read decision engine 406 is partly controlled by the write pointer decision engine 403, in the sense that a maximum read pointer is applied. This pointer must ensure that the read pointer does not progress beyond a point of valid data. The read pointer engine 406 writes the data from the multi-port memory component into the data_out FIFO 407. Reading the data from this FIFO 407 is done by an external block, based on the FIFO control signals.

The copy engine 205 notifies the write pointer decision engine 403 whenever a copy command is executed successfully. This allows the write pointer engine 403 to keep accurate track of the latest position which can be searched for patterns. This information is indicated through the MAX_RD_POINTER going to the read pointer decision engine 406. This makes it possible to design a simple FIFO like read interface. The read interface consist of a data bus and a selection of simple control signals indicating if unread data exist and are ready for transmission. FIG. 4 shows a total of 4 read and write ports to the memory, but the concept does not limit the actual number of read/write ports on the memory.

A speedup of the architecture depicted in FIG. 4 can be applied if necessary for the specific application. This can be achieved by using different clock frequencies at the input and output of the FIFOs connected to DATA_IN and DATA_OUT signals.

Figure 5:
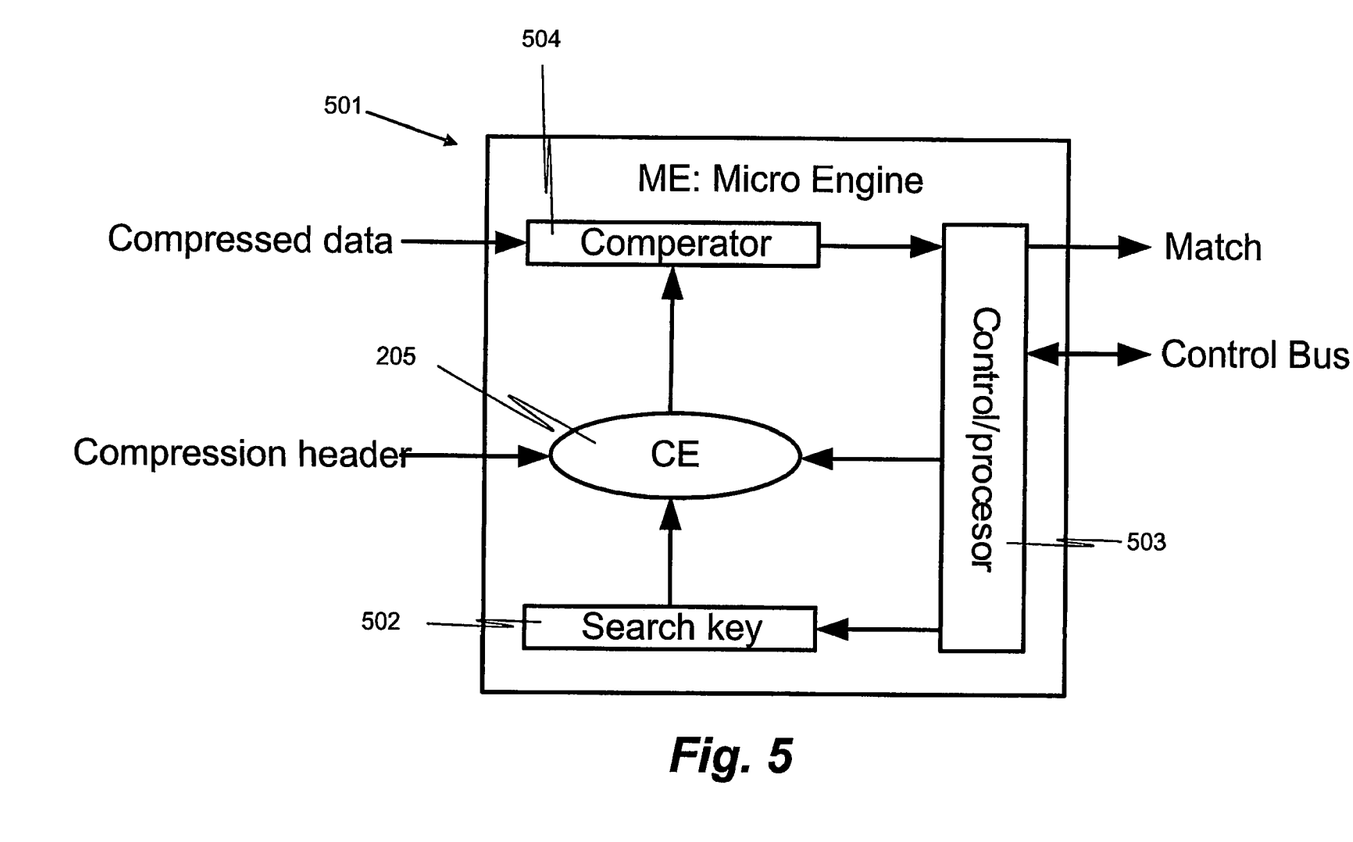

FIG. 5 shows the internal organisation of each Micro Engine (ME) 304. The ME 304 holds its specific search key in a register 502, and the content of this register is only modified in case the search pattern is changed. The compression engine (CE) 205 performs the actual compression of the search key based on the compression information contained in the packet compression header 302. Typically, the compression algorithm is well defined, but the settings are provided by the packet header. A comparator 504 compares the incoming compressed packet data with the compressed search key 502, and in case of a match, a signal indication is given to the control/processor block 503. All MEs 304 are configured by a shared control bus. Configuration includes search key settings and configuration of the CE 205.

The search key may contain one or more specific signs (wildcards) for representing predefined character patterns or truncations in one or more of the characters. Examples of this could be: "?" matching exactly one character, e.g. organi?e for truncation of organize and organise, "*" matching any number of characters, e.g. electric* for truncation of electric, electrical, electrics etc., and "%" matching 0-1 character, e.g. engine % for truncation of engine and engines. Alternatively, the pattern could be formatted using regular expression as known from for instance UNIX®.

The invention has been described with reference to a preferred embodiment. However, the scope of the invention is not limited to the illustrated embodiment, and alterations and modifications can be carried out without deviating from said scope of the invention.

The invention claimed is:

1. Method for inspection of compressed data packages, which are transported over a data network, the data packages comprising a data package header containing control data for securing the correct delivery and interpretation of the package and a payload part containing data to be transferred over the data network, wherein the method comprises the steps of:
   a) extracting payload data from the payload part of the package,
   b) appending the extracted payload data to a stream of data,
   c) probing the data package header so as to determine the compression scheme that is applied to the payload data,
   d) applying the determined compression scheme to at least one search pattern, which has previously been stored in a search key register, wherein the search pattern contains one or more specific signs or wildcards for representing predefined character patterns or truncations, and
   e) comparing the compressed search pattern to the stream of data to determine a match pattern between the compressed search pattern and the stream of data.

2. Method according to claim 1, wherein the data packages are compressed using a <offset, length> compression scheme.

3. Method according to claim 1, wherein the extracted payload data in step b) is applied to the stream of data by storing the payload data in a memory means and appending it to previously extracted payload data to form the stream of data.

4. Method according to claim 1, wherein the stream of data is formatted according to the Hypertext Transfer Protocol (HTTP).

5. Method according to claim 1, wherein the data packages are coded according to the Internet Protocol (IP).

6. Method according to claim 1, wherein the compression scheme in step d) is applied to two or more search patterns and the stream of data in step e) is inspected for these search patterns in parallel.

7. Method according to claim 1, wherein the data packages are transported between a client and a server, and wherein the method further comprises the step of:
   f) sending a response to the client or a third party server, if a match between the search pattern and the stream of data is detected in step e), the response comprising information related to the search pattern matched.

8. Method according to claim 7, wherein commercial information is presented to the client or third party server in step f) based on the detection of search patterns in step e).

9. Method according to claim 7, wherein prior to step d) a search string is sent from the client and stored in the search key register.

10. Method according to claim 7, wherein information related to parental control applications is presented to the client or third party server in step f).

11. Method according to claim 7, wherein location information is provided to the client or third party server during step f).

12. Method according to claim 1, wherein intrusion detection and/or intrusion prevention actions are carried out, if a specific intrusion search string is detected during step e).

13. Method according to claim 1, wherein also uncompressed data packages are inspected using uncompressed search strings.

14. Apparatus for inspection of a stream of compressed data that is transported over a data network, the data stream being split up into a number of data packages (301), the data packages comprising at least a header part (302) containing control data for securing the correct delivery and interpretation of the package and a payload part (303) containing data to be transferred over the data network, wherein the apparatus comprises:
  extraction means for extracting the payload parts of the data packages,
  probing means for probing the header part (302) and determining the compression scheme applied to the payload part (303),
  a search key register (502) for storing at least one search pattern, wherein the search key contains at least one specific sign representing a predefined character pattern or truncations in one or more of the characters, or a pattern formatted using a regular expression,
  compression means for compressing the search pattern using a predetermined compression scheme, and
  a comparator (501) for comparing the search pattern to the data stream.

15. Apparatus according to claim 14, further comprising a control module (503) for performing relevant actions, when a match between the search pattern and the data in the data stream is found.

16. Apparatus according to claim 14, wherein the apparatus is implemented using programmable hardware circuits, such as Field Programmable Gate Arrays (FPGA).

17. Apparatus for inspection of a stream of compressed data that is transported over a data network, the data stream being split up into a number of data packages (301), the data packages comprising at least a header part (302) containing control data for securing the correct delivery and interpretation of the package and a payload part (303) containing data to be transferred over the data network, wherein the apparatus comprises:
  extraction means for extracting the payload parts of the data packages,
  probing means for probing the header part (302) and determining the compression scheme applied to the payload part (303),
  a search key register (502) for storing at least one search pattern,
  compression means for compressing the search pattern using a predetermined compression scheme, and
  a comparator (501) for comparing the search pattern to the data stream, wherein
  the data stream is compressed using <offset, length> compression, and
  the compression means includes a memory structure with control circuits, the memory structure comprising:
    a First In First Out (FIFO) data queue (402) for temporarily storing an incoming compressed data stream,
    a multi-port memory (202) for storing the compressed data,
    a write pointer decision engine (403) for controlling transfer of data from the FIFO data queue (402) to the multi-port memory (202),
    a copy engine (205) for copying between locations in the multi-port memory (202) based on <offset, length> compression commands found in the incoming data stream, and
    a read pointer decision engine (406) for controlling the transfer of data from the multi-port memory (202).

18. Apparatus according to claim 17, further comprising a multiplexer circuit for loading and transmission of the incoming data stream and the compressed search pattern.

19. Apparatus according to claim 17, wherein the apparatus is adapted to reading of data to and from the multiport memory with different clock speeds.

\* \* \* \* \*